(12) United States Patent
Dabral et al.

(10) Patent No.: US 11,541,805 B2
(45) Date of Patent: Jan. 3, 2023

(54) SPATIAL LIGHT MODULATOR (SLM) CONTROLLER FOR HEADLIGHTS

(71) Applicant: Texas Instruments Incorporated, Dallas, TX (US)

(72) Inventors: Shashank Dabral, Allen, TX (US); John Peter Fenske, Richardson, TX (US); Mohhamad Jacob Pulliam, Rowlett, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/350,896

(22) Filed: Jun. 17, 2021

(65) Prior Publication Data
US 2022/0105863 A1 Apr. 7, 2022

Related U.S. Application Data
(60) Provisional application No. 63/088,839, filed on Oct. 7, 2020.

(51) Int. Cl.
| | |
|---|---|
| B60Q 1/14 | (2006.01) |
| G06T 5/00 | (2006.01) |
| G06T 7/70 | (2017.01) |
| F21S 41/64 | (2018.01) |
| F21S 41/675 | (2018.01) |
| G06T 7/20 | (2017.01) |
| G06V 20/56 | (2022.01) |

(52) U.S. Cl.
CPC .......... B60Q 1/1423 (2013.01); F21S 41/645 (2018.01); F21S 41/675 (2018.01); G06T 5/005 (2013.01); G06T 5/007 (2013.01); G06T 7/20 (2013.01); G06T 7/70 (2017.01); G06V 20/588 (2022.01); B60Q 2300/054 (2013.01); B60Q 2300/42 (2013.01); G06T 2207/30256 (2013.01)

(58) Field of Classification Search
CPC ............ B60Q 1/1423; B60Q 2300/054; B60Q 2300/42
See application file for complete search history.

(56) References Cited

U.S. PATENT DOCUMENTS

| | | |
|---|---|---|
| 6,497,503 B1 | 12/2002 | Dassanayake et al. |
| 10,831,157 B2 * | 11/2020 | Christmas ............ G03H 1/2205 |
| 2002/0196636 A1 | 12/2002 | Dassanayake et al. |
| 2008/0198372 A1 | 8/2008 | Pan |

OTHER PUBLICATIONS

Brandon Seiser, "Improving Visibility with DLP Headlights", Texas Instruments Incorporated, Dec. 2020, pp. 1-7.
Tristan Garcia, "DLP5531-Q1 Chipset Video Processing for Light Control Applications", Texas Instruments Incorporated, Application Report, DLPA101, Oct. 2018, pp. 1-29.

* cited by examiner

Primary Examiner — Robert J May
(74) Attorney, Agent, or Firm — Michelle F. Murray; Frank D. Cimino

(57) ABSTRACT

A controller is provided that includes a bit plane generation component and a processor configured to receive one or more headlight commands and to configure the bit plane generation component to generate bit planes of a headlight frame responsive to the one or more headlight commands, wherein the bit plane generation component includes bit generation pipelines configured to operate in parallel to generate respective bits of consecutive bits of a bit plane of the headlight frame.

27 Claims, 8 Drawing Sheets

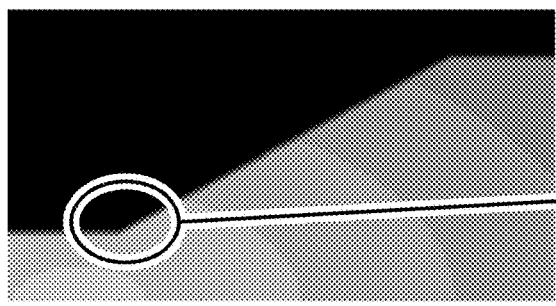
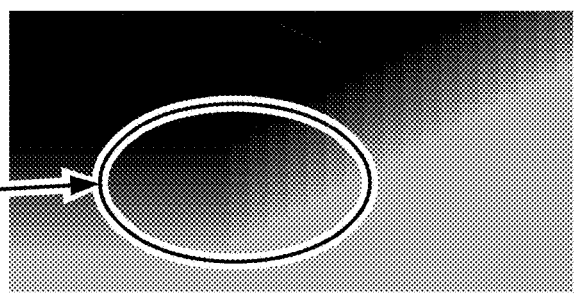
FIG. 8A              FIG. 8B
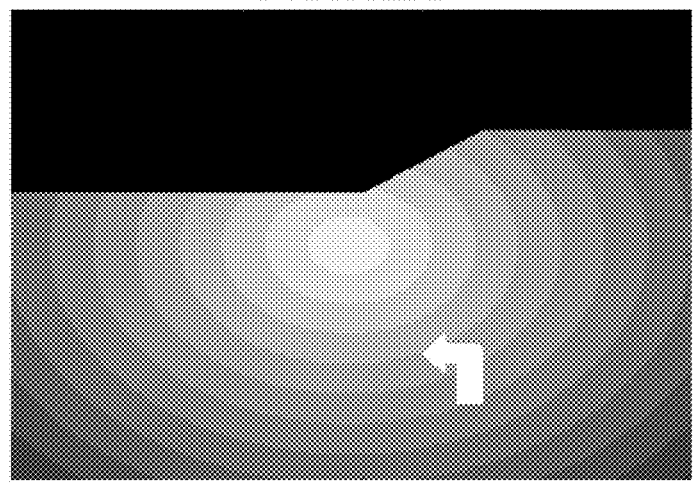
FIG. 9

SPATIAL LIGHT MODULATOR (SLM) CONTROLLER FOR HEADLIGHTS

CROSS-REFERENCE TO RELATED APPLICATIONS

This application claims benefit of U.S. Provisional Patent Application No. 63/088,839 filed Oct. 7, 2020, entitled "A Low Cost Bit Plane Based DMD Controller for Headlight Applications," which application is incorporated herein by reference in its entirety.

BACKGROUND

Recently, there has been a big push in the automotive lighting industry to improve both vehicle headlight functionality and driver visibility, which has led to the development of adaptive driving beam (ADB) headlights. An ADB system automatically controls the entire headlight, including high beams, enabling drivers to focus on the road and stop toggling high beams on or off based on lighting conditions and the presence of oncoming vehicles. More specifically, an ADB system enables a driver to drive with the high beams on at all times at night while automatically avoiding glare to drivers of oncoming vehicles.

An ADB system may use cameras and other sensors to detect oncoming vehicles and continuously shape the high beams to avoid glare in the detected oncoming vehicle locations while continuing to fully illuminate other areas in front of the vehicle. Some such ADB systems are based on spatial light modulators (SLMs), e.g., high-resolution headlight digital micromirror devices (DMDs) or liquid crystal on silicon (LCOS). The use of SLMs in headlights can improve visibility over other technologies and also provide support for advanced driver assistance system (ADAS) functionality.

SUMMARY

Embodiments of the present disclosure relate to a spatial light modulator (SLM) controller for headlights. In one aspect, a controller is provided that includes a bit plane generation component and a processor configured to receive one or more headlight commands and to configure the bit plane generation component to generate bit planes of a headlight frame responsive to the one or more headlight commands, wherein the bit plane generation component includes bit generation pipelines configured to operate in parallel to generate respective bits of consecutive bits of a bit plane of the headlight frame.

In one aspect, a method is provided that includes generating, by bit plane generation pipelines included in a bit plane generation component included in a controller, consecutive bits of a bit plane of a headlight frame, wherein the bit generation pipelines are configured to operate in parallel to generate respective bits of the consecutive bits of the bit plane, wherein the consecutive bits are one selected from a column of the bit plane and a row of the bit plane, and storing the consecutive bits in a buffer comprised in the controller.

In one aspect, a vehicle is provided that includes a headlight including a spatial light modulator (SLM), an SLM headlight controller including an SLM interface coupled to the SLM, a bit plane generation component coupled to the SLM interface, wherein the bit plane generation component includes bit generation pipelines configured to operate in parallel to generate respective bits of consecutive bits of a bit plane of a headlight frame, and a processor coupled to the bit plane generation component and the processor configured to receive one or more headlight commands and to configure the bit plane generation component responsive to the one or more headlight commands, and an advanced driver assistance systems (ADAS) electronic control unit (ECU) coupled to the processor, the ADAS ECU configured to generate the one or more headlight commands.

BRIEF DESCRIPTION OF THE DRAWINGS

FIGS. 4A-9 are examples illustrating outputs of components of the bit generation pipeline of FIG. 3;

DETAILED DESCRIPTION

Figure 1:
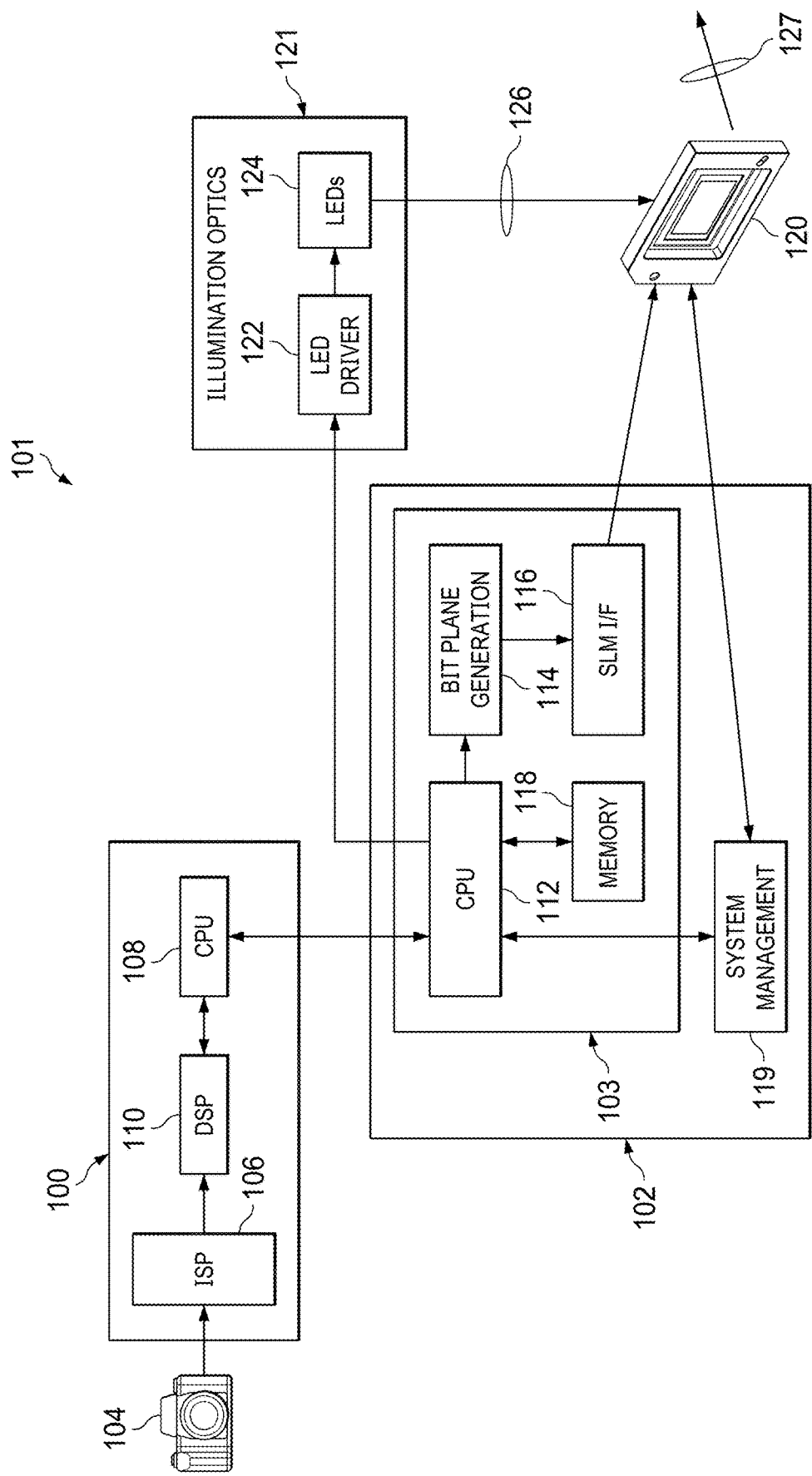
FIG. 1 is a high level block diagram of an example ADAS electronic control unit (ECU) and an example spatial light modulator (SLM) headlight control unit suitable for implementing an adaptive driving beam (ADB) headlight system in a vehicle.

Specific embodiments of the disclosure are described herein in detail with reference to the accompanying figures. Like elements in the various figures are denoted by like reference numerals for consistency.

Embodiments of the disclosure provide an architecture for a spatial light modulator (SLM) headlight control unit including an SLM controller that directly generates the bit planes of a headlight frame for projection by an SLM without storing the full headlight frame, which reduces the amount of memory in the control unit. Further, unlike some prior art control units, the SLM headlight control unit does not include a graphics processing unit to generate the headlight frames, thus reducing the cost of the SLM headlight control unit. Generically, a spatial light modulator is a device that can control or change the amplitude, phase, or polarization of light waves. In general, an SLM for a headlight includes a two-dimensional (2D) array of pixel cells each of which is configured to project a pixel of a headlight frame. Further, the intensity of the light projected by each pixel cell can be spatially modulated. Example of SLMs include digital micromirror devices (DMDs) including a 2D array of tiltable micromirrors, liquid crystal devices (LCDs) including a 2D array of transmissive liquid crystal pixel cells, and liquid crystal on silicon (LCoS) devices including a 2D array of liquid crystal pixel cells on a reflective substrate.

In some embodiments, the SLM headlight control unit is used to implement an adaptive driving beam (ADB) headlight system in a vehicle incorporating one or more advanced driver assistance system (ADAS) applications. In such embodiments, the SLM headlight control unit receives headlight frame commands from one or more advanced driver assistance system (ADAS) applications, e.g., an ADB application, and causes the projection of headlight frames by an SLM responsive to the frame commands.

FIG. 1 is a high level block diagram of an example adaptive driving beam (ADB) headlight system 101 including an ADAS electronic control unit (ECU) 100, an SLM headlight control unit 102, an SLM 120, an illumination source 121, illumination optics 126, and projection optics 127. The ADAS ECU 100, which may also be referred to as an ADAS domain controller or a sensor fusion controller, includes functionality to fuse sensor data from multiple sensors positioned on a vehicle, e.g., cameras, short- and long-range radar, lidar, ultrasound sensors, etc., for use by various ADAS applications, e.g., adaptive cruise control, lane tracking, obstacle detection, automatic braking, etc. The ADAS ECU 100 is coupled to a front facing camera 104 on the vehicle that may be used for capturing images of the scene in front of the vehicle for use by one or more ADAS applications. The ADAS ECU 100 includes an image signal processor (ISP) 106, a central processing unit (CPU) 108, and a digital signal processor (DSP) 110. The ISP 106 includes functionality to receive raw sensor data captured by the camera 104 and perform image processing on the raw sensor data to generate images suitable for use by ADAS applications e.g., decompanding, pixel correction, lens shading correction, spatial noise filtering, global and local brightness and contrast enhancement, de-mosaicing, and color conversion.

The CPU 108 hosts an ADB headlight application that generates headlight frame commands for the SLM headlight control unit 102. The headlight frame commands may be based on, for example, user inputs for headlight control, e.g., dimming or brightening the headlights, turning ADB on and off, enabling and disabling lane tracking, etc., and inputs from analysis of the scene in front of the vehicle, e.g., detection of objects in the scene. The CPU 108 includes functionality to communicate with the SLM headlight control unit 102 to provide the headlight frame commands. Communication between the CPU 108 and the SLM headlight control unit 102 may be implemented, for example, using a controller area network (CAN) or Ethernet protocol stack.

The DSP 110 includes functionality to process images captured by the camera 104 to detect objects in the scene, e.g., oncoming vehicles, and generate coordinates of bounding boxes indicating the locations of the objects. Objects may be, for example, oncoming vehicles, signs, etc. The DSP 110 provides these coordinates to the ADB headlight application for use in headlight frame commands for masking of the objects in the scene.

The SLM headlight control unit 102 is coupled to the SLM 120 and to the illumination source 121 for the SLM 120 in a headlight module (not shown). The illumination source 121 includes a light-emitting diode (LED) driver 122 coupled to one or more white LEDs 124 and is configured to provide white light to illuminate the SLM 120 according to illumination control signals from the SLM controller 103. Illumination optics 126 are optically coupled between the SLM 120 and the LEDs 124 to prepare the light for illuminating the SLM 120. Projection optics 127 are optically coupled to the SLM 120 to receive light reflected by the SLM 120 and project the reflected light into the scene. Any suitable illumination optics and projection optics may be used. The SLM 120 may be an LCOS, an LCD, or a DMD, for example, a 1.3 megapixel DMD with 576×1152 input resolution.

The SLM headlight control unit 102 includes an SLM controller 103 and a system management component 119.

The SLM controller 103 includes a CPU 112, a bit plane generation component 114, an SLM interface (I/F) 116 and memory 118, e.g., a flash memory or other suitable memory technology. In some embodiments, the SLM controller 103 is implemented as a system-on-a-chip (SOC) or a field programmable gate array (FPGA). In general, the SLM controller 103 includes functionality to receive headlight frame commands from the ADB headlight application and cause the projection of headlight frames by the SLM 120 responsive to the received commands. More specifically, the SLM controller 103 generates pixels of a headlight frame and breaks the pixels into individual bit planes that are transmitted to the SLM I/F 116. A bit plane is array of bits of the same dimensions as a headlight frames, where each bit in the array is extracted from a same pixel position in each pixel of the headlight frame. For example, assuming an 8-bit pixel in a headlight frame, eight bit planes 0-7 may be generated, where bit plane 0 includes the bits at position 0 in each pixel, bit plane 1 includes the bits at position 1 in each pixel, etc.

The system management component 119 includes functionality to control the power of the SLM 120 and provide monitoring and diagnostic information for the SLM 120 and the SLM controller 103 to the CPU 112.

A pulse width modulation (PWM) sequence stored in memory 118 includes information such as how many bit planes are to be displayed, the amount of time each bit plane is to be displayed, the order in which the bit planes are to be displayed, and illumination control signals for synchronization of the illumination from the illumination source 121 with the SLM 120. As is further described herein, the SLM controller 103 uses the information in the PWM sequence to configure the bit plane generation component 114 to generate the specified number of bit planes in the specified order and to synchronize the operation of the illumination source 121 with the projection of the bit planes by the SLM 120. The SLM interface 116 includes functionality to manage the communication of the bit planes to the SLM 120 for projection.

The CPU 112 includes functionality to communicate with the CPU 108 to receive headlight frame commands from the ADB headlight application. The communication functionality may be, for example, a controller area network (CAN) or Ethernet protocol stack. The CPU 112 also includes functionality to interpret the headlight frame commands and configure the bit plane generation component 114 to generate bit planes for projection by the SLM 120 responsive to the headlight frame commands and a PWM sequence. For example, if a headlight frame command includes the bounding box coordinates for an oncoming vehicle, the SLM controller 103 configures the bit plane generation component 114 to generate bit planes with a high beam headlight pattern for projection by the SLM 120 in which the areas indicated by the bounding box coordinates are masked in the high beam headlight pattern to prevent glare.

More specifically, a control application executing on the CPU 112 interprets each headlight frame command to determine the content of headlight frames to be projected and then configures the bit plane generation component 114 to generate corresponding bit planes in the order specified by the PWM sequence. Configuration of the bit plane generation component 114 is explained in more detail below. Further, the control application transmits the illumination control signals for each bit plane in the PWM sequence to the LED driver 122 in the order indicated.

Headlight frame commands may be received by the CPU 112 asynchronously with the operation of the bit plane generation component 114. More specifically, headlight frame commands may be received at any time. However, any headlight frame commands received while the bit plane generation component 114 is generating bit planes for a headlight frame will have no effect on that headlight frame. Rather, any modifications indicated by such headlight frame commands are applied to the operation of the bit plane generation component 114 for the next headlight frame.

The bit plane generation component 114 includes functionality to generate a bit plane to be projected by the SLM 120. For each bit plane of a headlight frame, the bit plane generation component 114 generates the pixels of the frame in column major order and extracts the bit plane from the generated pixels. For example, if a bit plane corresponding to bit 3 of the pixels of an 8-bit pixel frame is to be projected, the bit plane generation component 114 generates all the pixels of the frame column by column and extracts the value of bit 3 in each pixel to generate the bit plane. If the next bit plane to be projected corresponds to bit 4 of each pixel, the bit plane generation component 114 again generates all the pixels of the frame column by column and extracts the value of bit 4 in each pixel to generate the bit plane.

Figure 2:
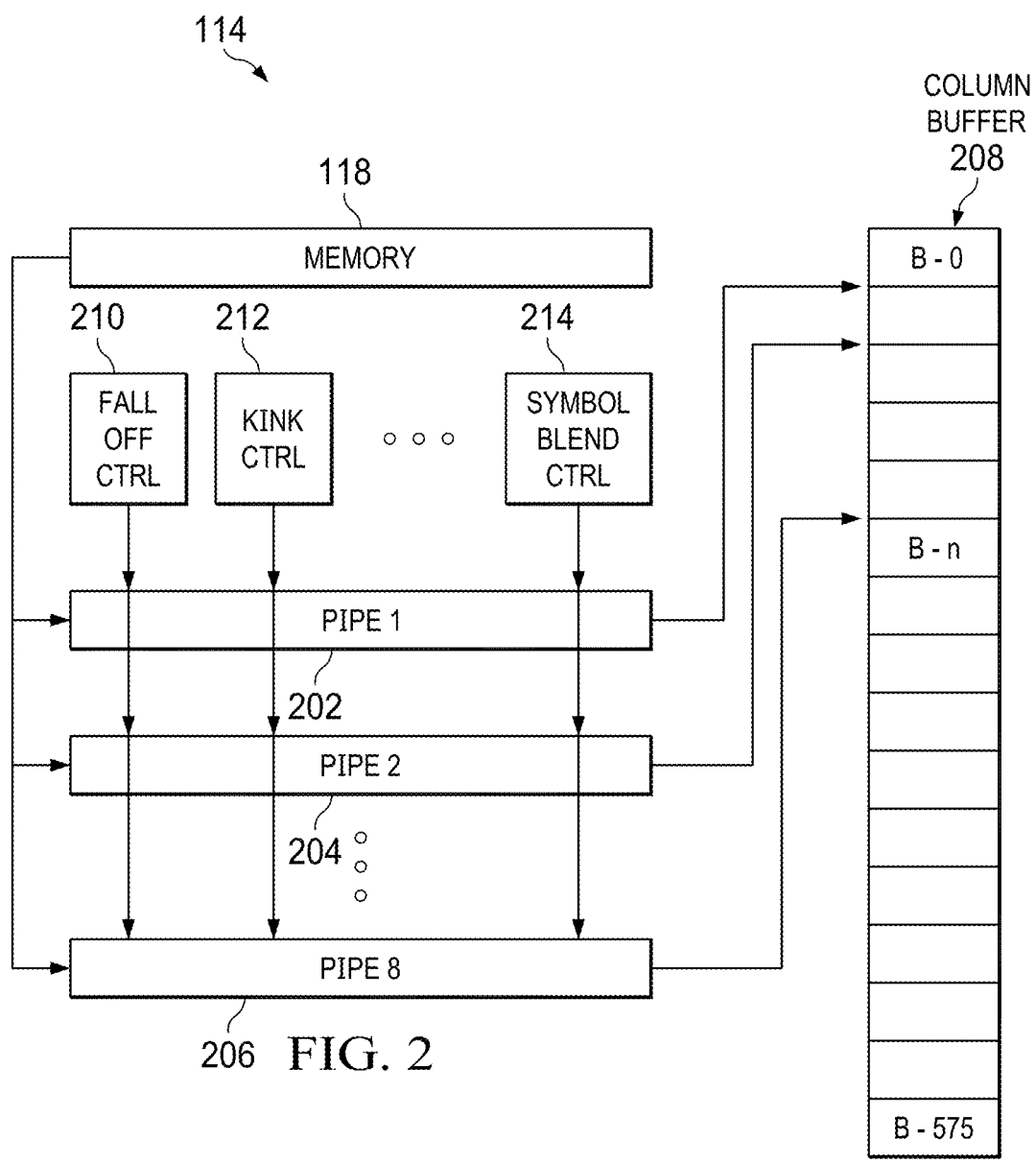
FIG. 2 is a high level block diagram of the bit plane generation component of the SLM headlight control unit of FIG. 1.

FIG. 2 is a high level block diagram of the bit plane generation component 114. In this example, the bit plane generation component 114 includes eight bit generation pipelines 202-206 and six control components 210-214. Functionality of the control components 210-214 is further described herein in reference to FIG. 3. In addition, each of the pipelines 202-206 is coupled to memory 118 (FIG. 1) for access by one or more components of the pipelines 202-206 as further described herein. Each of the eight bit generation pipelines 202-206 is configured to generate one pixel of a respective row of a headlight frame, extract the bit from the pixel at a bit position corresponding to the bit plane being generated, and store the extracted bit in a location in column buffer 208 corresponding to the row of the pixel in the headlight frame. More specifically, the pipelines 202-206 operate in parallel to generate eight consecutive pixels of a column of a headlight frame in each cycle (once the pipelines are full) and output respective bits of the bit plane to the column buffer 208 in locations corresponding to the pixel locations in the column.

In an example, the resolution of a headlight frame is 1152 columns×576 rows and the column buffer 208 includes 576 entries. The location of a pixel in a headlight frame with x columns and y rows is indicated by (x, y) where x is the column number and y is the row number in the headlight frame. For example, the location of a pixel in the ninth column and eighth row of a headlight frame is (9, 8). Further, the location of the bit extracted from this pixel in the column buffer 208 when column 9 of the headlight frame is generated by the bit plane generation component 114 is the eighth position in the buffer.

Figure 3:
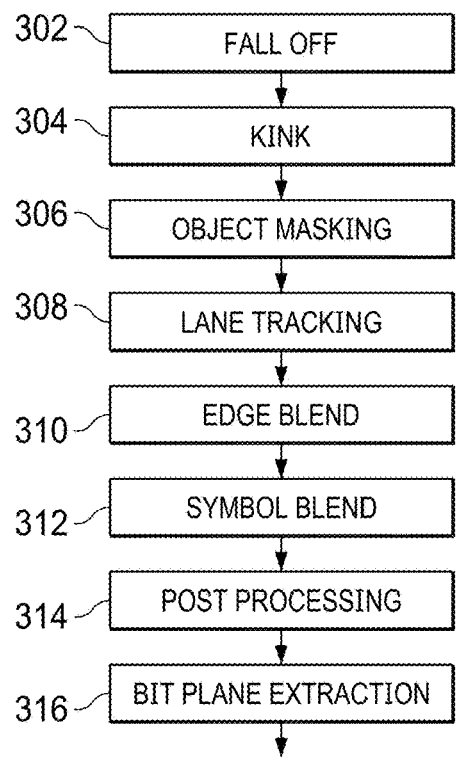
FIG. 3 is a high level block diagram of an example bit generation pipeline in the bit plane generation component of FIG. 2.

FIG. 3 is a high level block diagram of an example bit generation pipeline 202-206. The illustrated pipeline includes six types of pixel processing components 302-312 coupled in a sequence each of which, when enabled, outputs a pixel of a headlight frame at each clock cycle in accordance with an aspect of headlight functionality supported by the SLM controller 103. The pixel processing components 302-312 include a fall off component 302, a kink component 304, an object masking component 306, a lane tracking component 308, an edge blend component 310, and a symbol blend component 312. Conceptually, these six components generate the pixel values of a headlight frame in successive layers in which the fall off component 302 generates the base layer of the headlight frame and each successive component, if enabled, adds a layer to the headlight frame by modifying pixel values output by the previous component according to the aspect of headlight functionality provided by the component. If a component is not enabled, the component passes a received pixel to a next component with no modification.

The six pixel processing components 302-312 are followed by a post processing component 314 and a bit plane extraction component 316. Further, each control component of the control components 210-214 (FIG. 2) is coupled a same type of pixel processing component in each of the eight bit generation pipelines 202-206. That is, each control component 210-214 is coupled to eight pixel processing components 302-312 of the same type. For example, the fall off control component 210 is coupled to eight fall off components, one in each pipeline 202-206. In another example, the kink control component 212 is coupled to eight kink components, one in each pipeline 202-206. The control components 210-214 include functionality to store configuration parameter values for the coupled pixel processing components as supplied by the control application executing on the CPU 108 (FIG. 1).

Figure 4A:
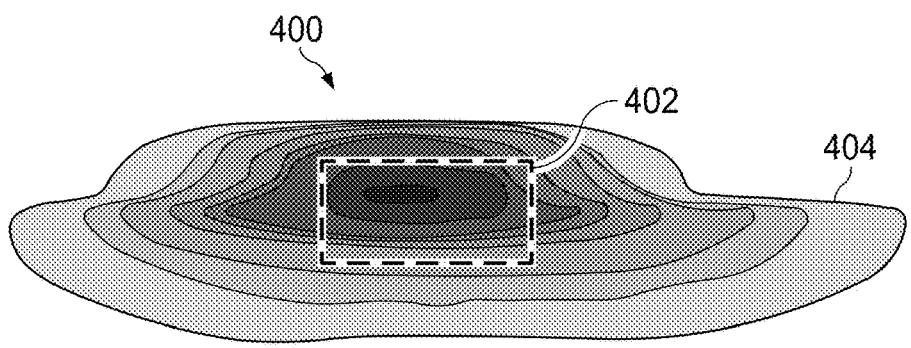

The fall off component 302 generates pixels of a base layer of a headlight frame. A headlight frame is the area of the base headlight profile provided by the SLM 120. In general, a headlight profile is the overall projection pattern of a vehicle headlight including the SLM 120 and one or more illumination sources, e.g., a matrix of LEDs with a separate controller. FIG. 4A is an example illustrating a base headlight profile 400 in which the high beam of the vehicle headlight is turned on. The base headlight profile 400 has a peak light intensity in the center with intensity falling off radially toward the edges. The rectangle 402 is the headlight frame which covers the area of highest intensity in the base headlight profile. The line 404 represents the horizon. In an example where the SLM 120 is a DMD, the rectangle frame 402 covers a field of view of approximately 14 degrees horizontally across the horizon 404 (−10 to +4 degrees) by 7 degrees vertically (−5 below the horizon 404 to 2 degrees above the horizon 404). The illumination outside the rectangle 402 is provided by the one or more other illumination sources located in proximity to the SLM 120 in the vehicle headlight.

Figure 4B:
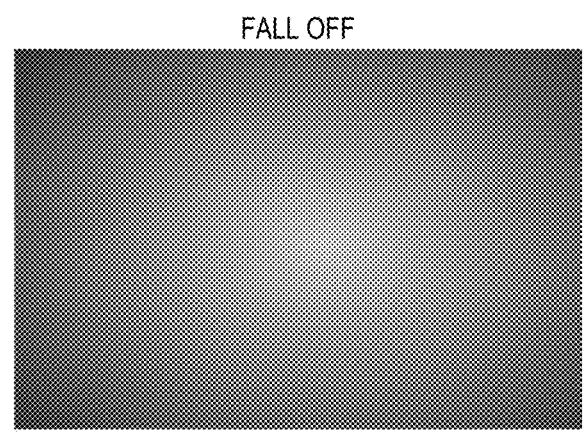

The headlight frame pixels output by the fall off component 302 correspond to the rectangle 402. Subsequent components in the pipeline may modify some of these pixels. FIG. 4B shows an example of a headlight frame generated by the fall off component 302. The radial fall off is defined with the following parameters provided in a headlight frame command: center position, center intensity, edge intensity, and the fall off coefficient which indicates how fast the intensity should fall off radially. For each pixel, the fall off component 302 determines the intensity of the pixel based on the distance from the center pixel position to the pixel location.

The kink component 304 generates pixels for a headlight profile in which both the high beam and the low beam are on. In such a profile, the headlight frame is considered to have a high beam region and a low beam region. The kink component 304 receives pixels from the fall off component 302 and changes the values of any pixels in the high beam region of the headlight frame such that no light will be projected by the SLM 120 for those pixel locations, e.g., the pixel values are set to zero. Instead of having a flat horizontal line between high and low beam regions of the headlight frame, a slightly elevated region referred to as a kink is included in the headlight frame.

Figure 5:
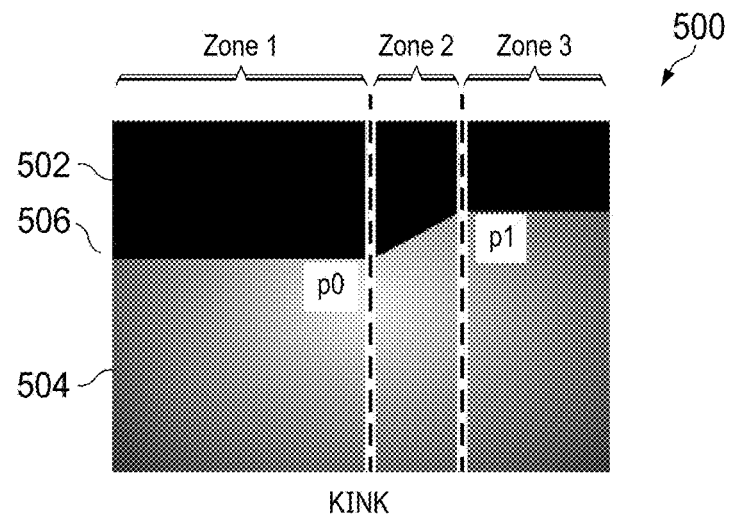

FIG. 5 shows an example of a headlight frame 500 with a kink. The high beam region 502 of the headlight frame 500 is dark and the low beam region 504 retains the pixel values from the fall off component 302. The area above the horizon 506 in the low beam region 504 beginning at p0 corresponds approximately to the lane in the direction of travel of the vehicle while the area above the horizon 506 in the high beam region ending with p0 corresponds approximately to the lane of oncoming traffic. This separation between the high and low beam regions helps ensure that oncoming traffic is not subjected to glare while allowing for a larger light region in the direction of travel. The kink position is flexible to allow for modulation during steering. For example, if the steering wheel of the vehicle is turned all the way to the right, the kink may move to the right.

A kink is defined by a headlight frame command specifying the start point p0, the stop point p1, and the coefficients of the line between those two points as given by y=mx+c where m is the slope of the line, c is the y-intercept, y is the row coordinate of a point on the line and x is the column coordinate of the point. The kink component 304 divides the headlight frame into three zones as illustrated in the example of FIG. 5. For pixels falling in zone 1, the determination of whether the pixel is in the high beam region 502 or the low beam region 504 is a simple comparison of the y coordinate of the pixel with the y coordinate of p0. Similarly, for pixels falling in zone 3, the determination of whether the pixel is in the high beam region 502 or the low beam region 504 is a simple comparison of the y coordinate of the pixel with the y coordinate of p1. For pixels falling in zone 2, the determination of whether the pixel is in the high beam region 502 is a comparison of the y coordinate of the pixel with the value of mx+c. Note that because the pixels are generated in column major format, the value of the column coordinate x is constant for all pixels in a column.

Figure 6:
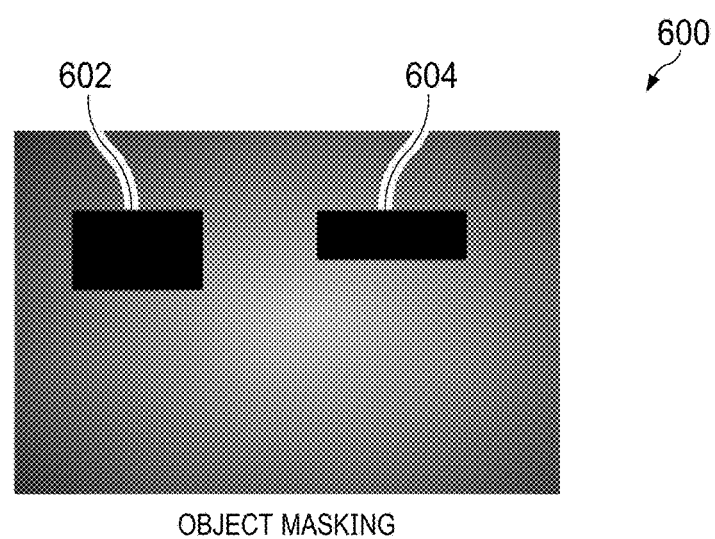

The object masking component 306 generates pixels for a headlight profile in which the light in one or more regions indicated by headlight frame commands is turned off or masked in the headlight frame. Such a region may be referred to as a mask region herein. The object masking component 306 receives pixels from the fall off component 302 and changes the values of any pixels in the identified regions of the headlight frame such that no light will be projected by the SLM 120 for those pixel locations, e.g., the pixel values are set to zero. FIG. 6 shows an example of a headlight frame 600 with two masking regions 602, 604. A masking region may be defined by the coordinates of the top left corner pixel and the bottom right corner pixel. The determination of whether or not a pixel is in a masking region can be made by comparing the coordinates of the pixel to the coordinates of the top left corner pixel and the bottom right corner pixel.

The lane tracking component 308 generates pixels for a headlight profile in which a region of the headlight frame indicated by headlight frame commands is highlighted, i.e., the intensity of the projected light in a specified lane tracking region is increased to indicate where the lane in which the vehicle is driving is located. The lane tracking component 308 receives pixels generated by a previous enabled component and changes the values of any pixels in the specified lane tracking region of the headlight frame such that the intensity of the light projected by the SLM 120 is increased for those pixel locations.

Figure 7A:
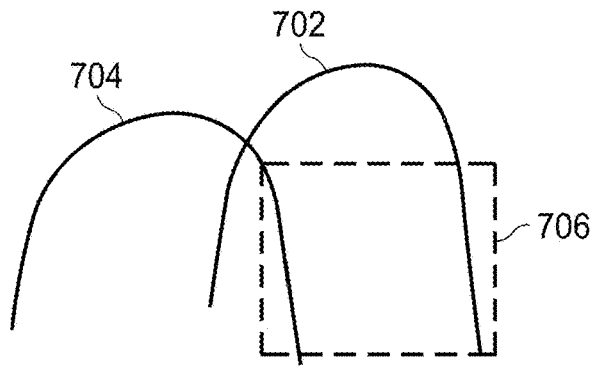

The lane tracking component 308 determines the lane tracking region in which the intensity of the light is to be increased based on two quadratic equations representing left and right curved boundaries of the lane:

$$yl = dl(x^2) + el(x) + fl$$

$$yr = dr(x^2) + er(x) + fr;$$

the coordinates of a bounding box, and a lane direction flag indicating whether the lane is straight, curving to the left, or curving to the right. The graph of quadratic equation is a parabola. The above equations represent two parabolas, one for the left boundary of the lane and one for the right boundary of the lane. As illustrated in the simple example of FIG. 7A, the lane boundaries are indicated by the right "leg" of each parabola, i.e., the right leg of the left parabola 704 is the left boundary of the lane and the right leg of the right parabola 702 is the right boundary of the lane. The bounding box serves to further bound the region in which the intensity is to be increased in order to eliminate outlying results of the quadratic equations. The values of the coefficients of the quadratic equations, dl, dr, el, er, fl, and fr, as well as the coordinates of the upper left corner and lower right corner of the bounding box and the lane direction flag are provided in one or more headlight frame commands.

If the lane direction flag indicates a left curve, the lane tracking component 308 compares the coordinates (y,x) of the received pixel as follows to determine if the intensity of the received pixel is to be increased:

$$y > yl \& y < yr \& \{y > Y\_start \& x > X\_start \\ \& y < Y\_end \& x < X\_end\},$$

where Y_start and X_start are the coordinates of the upper left corner of the bounding box and Y_end and X_end are the coordinates of the bottom right corner of the bounding box. If all the conditions are true, the intensity of the received pixel is increased.

If the lane direction flag indicates a right curve, the lane tracking component 308 compares the coordinates (y,x) of the received pixel as follows to determine if the intensity of the received pixel is to be increased:

$$y < yl \& y > yr \& \{y > Y\_start \& x > X\_start \\ \& y < Y\_end \& x < X\_end\},$$

where Y_start and X_start are the coordinates of the upper left corner of the bounding box and Y_end and X_end are the coordinates of the bottom right corner of the bounding box. If all the conditions are true, the intensity of the received pixel is increased.

If the lane direction flag indicates the lane is straight, the lane tracking component 308 ignores the results of the quadratic equations and uses the bounding box coordinates to determine if the intensity of the received pixel is to be increased:

$$Y > Y\_start \& x > X\_start \& y < Y\_end \& x < X\_end,$$

where Y_start and X_start are the coordinates of the upper left corner of the bounding box and Y_end and X_end are the coordinates of the bottom right corner of the bounding box. If all the conditions are true, the intensity of the received pixel is increased.

Figure 7B:
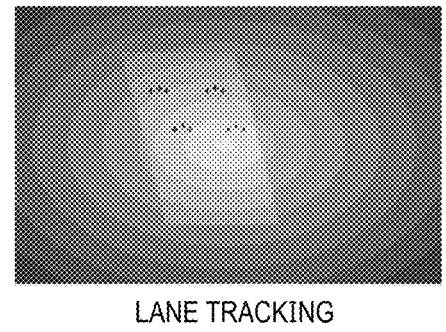

FIG. 7B shows an example of a headlight frame with lane tracking enabled. In this example, the lane is curving to the left. The small symbols in the headlight frame are lane tracking symbols that may be added by the symbol blend component 312 when lane tracking is enabled.

The edge blend component 310 generates pixels for a headlight profile in which designated edges in the headlight frame introduced by previous components in the pipeline are blended to create an intensity modulated boundary. In general, an edge is a set of contiguous pixel locations where an abrupt change in intensity values occurs. For example, as illustrated in FIG. 5, there is an edge between the high beam region and the low beam region of the headlight frame after processing by the kink component 304. In another example, as illustrated in FIG. 6, edges are also present as the result of object masking.

The edge blend component 310 uses a gain lookup table (LUT) indexed by the distance of the input pixel from the edge to determine how much to modulate the pixel intensity. That is, the result of y−(mx+c) is used to determine a gain to be applied to each input pixel, i.e., Blend_Gain=LUT[y−(mx+c)] where y is the row coordinate of the pixel, x is the row column coordinate of the pixel, m is the slope from the pixel to the edge, and c is the y intercept. The number of entries in the gain LUT depends on the width of the blending area from the edge. For example, if the width is ten pixels, there are ten entries in the gain LUT, e.g., LUT={0, 0.1, 0.2, 0.3, 0.4, 0.5, 0.6, 0.7, 0.8, 0.9}. In this example, the entries in the gain LUT modulate the pixel intensity in 10% increments from the base level to 0. FIG. 8A shows an example of a headlight frame with a kink after edge blending and FIG. 8B show a closer view of a portion of the blended edge of the kink.

The symbol blend component 312 generates pixels for a headlight profile in which one or more symbols, e.g., navigation symbols, road construction, freeze warning, etc., are added to the headlight frame in symbol location(s) indicated by headlight frame commands. Any symbols that can be added to the headlight frame are pre-rendered and stored in memory 118 (FIG. 2) along with corresponding symbol masks. In some embodiments, a binary blend is used to add the symbol to the headlight frame. In other embodiments, an alpha blend is used. Binary and alpha blends are explained in more detail below.

A pre-rendered symbol is stored as a rectangle of pixel values including the pixel values of the symbol and values of pixels surrounding the symbol in the rectangle. For example, if the symbol is an arrow that is 100 pixels long from tip to base and 50 pixels wide at the widest point, the pre-rendered symbol may be a 105×55 rectangle. As is explained in more detail herein, the values of pixels surrounding the symbol in the pre-rendered symbol are ignored when the symbol is added to a headlight frame. The symbol mask corresponding to a pre-rendered symbol has the same number of entries as the number of pixels in the pre-rendered symbol. The size of each entry may depend on whether a binary blend or an alpha blend is to be used to add the symbol to a headlight frame. If a binary blend is to be used, each entry may be a single bit and if an alpha blend is to be used, each entry includes the same number of bits as a pixel.

A headlight command provides a symbol identifier for a pre-rendered symbol stored in memory 118 and coordinates of a top left pixel of a rectangular location, i.e., a symbol location, for the pre-rendered symbol in the headlight frame. The rectangular location is the same size as the pre-rendered symbol. The symbol blend component 312 receives pixels from a previous enabled component and changes the values of pixels in the specified rectangular location of the headlight frame as indicated by the symbol mask to add the symbol to the headlight frame. If a binary blend is used, the value of a location in the symbol mask indicates whether the value of a corresponding pixel in the rectangular location is to be changed to the corresponding pixel value in the pre-rendered symbol or is to remain unchanged. For example, assume the rectangular location and the pre-rendered symbol are 100×55 pixels, and the symbol mask is 100×55 bits. If the value of the location (25,30) in the symbol mask is 0, the corresponding pixel value at location (25,30) in the rectangular location is not changed and if the value is 1, the corresponding pixel value at location (25,30) in the rectangular location is changed to the corresponding pixel value at location (25,30) in the pre-rendered symbol. FIG. 9 shows an example of a low beam head light frame that includes a symbol in the low beam region that was added using a binary blend.

If an alpha blend is used, each bit of a location in the symbol mask indicates whether a corresponding bit of a corresponding pixel in the rectangular location is to be changed to the value of a corresponding bit of a corresponding pixel value in the pre-rendered symbol or is to remain unchanged. For example, assume the rectangular location, the pre-rendered symbol, and the symbol mask are 100×55. If the value of the bit, e.g., bit 3, in the symbol mask at location (25,30) is 0, the corresponding bit, e.g., bit 3, of the corresponding pixel value at location (25,30) in the rectangular location is not changed. If the value is 1, the corresponding bit, e.g., bit 3, of the corresponding pixel value at location (25,30) in the rectangular location is changed to the value of the corresponding bit, e.g., bit 3, of the corresponding pixel value at location (25,30) in the pre-rendered symbol.

The post processing component 314 applies gamma correction and dithering to each generated pixel. Gamma correction is performed to adjust the pixel intensity to account for human visual perception of brightness. The gamma correction may be implemented, for example, as an 8 bit×8 bit transform. More specifically, a 256×8 bit table addressable by the input pixel value stores a gamma corrected pixel value that replaces the input pixel value.

The post processing component 314 then applies spatial dithering to the gamma corrected pixel value and outputs a post processed pixel. In general, dithering introduces high frequency noise to increase perceived bit depth. Spatial dithering is the application of a spatially high frequency dither masked to determine whether a pixel value is rounded up or down to a natively achievable brightness intensity level. In this example, two percentage values are calculated for a gamma corrected pixel value and compared to determine whether to round the pixel intensity up or down. One percentage value, referred to herein as the threshold percentage value, is a threshold from a dither mask look-up table addressed by the coordinates of the pixel. The other percentage value, referred to herein as the pixel intensity percentage, is calculated based on the desired pixel intensity distance between the upper and lower bounding native pixel intensity levels. If the pixel intensity percentage is greater than the threshold percentage, the pixel value is rounded up to the upper bounding native pixel intensity level; otherwise, the pixel value is rounded down.

The bit plane extraction component 316 extracts the bit at the bit position corresponding to the bit plane being generated from the post processed pixel output by the post processing component 314 and stores the bit in the corresponding location in the column buffer 208 (FIG. 2). The remaining bits are discarded.

Figure 10:
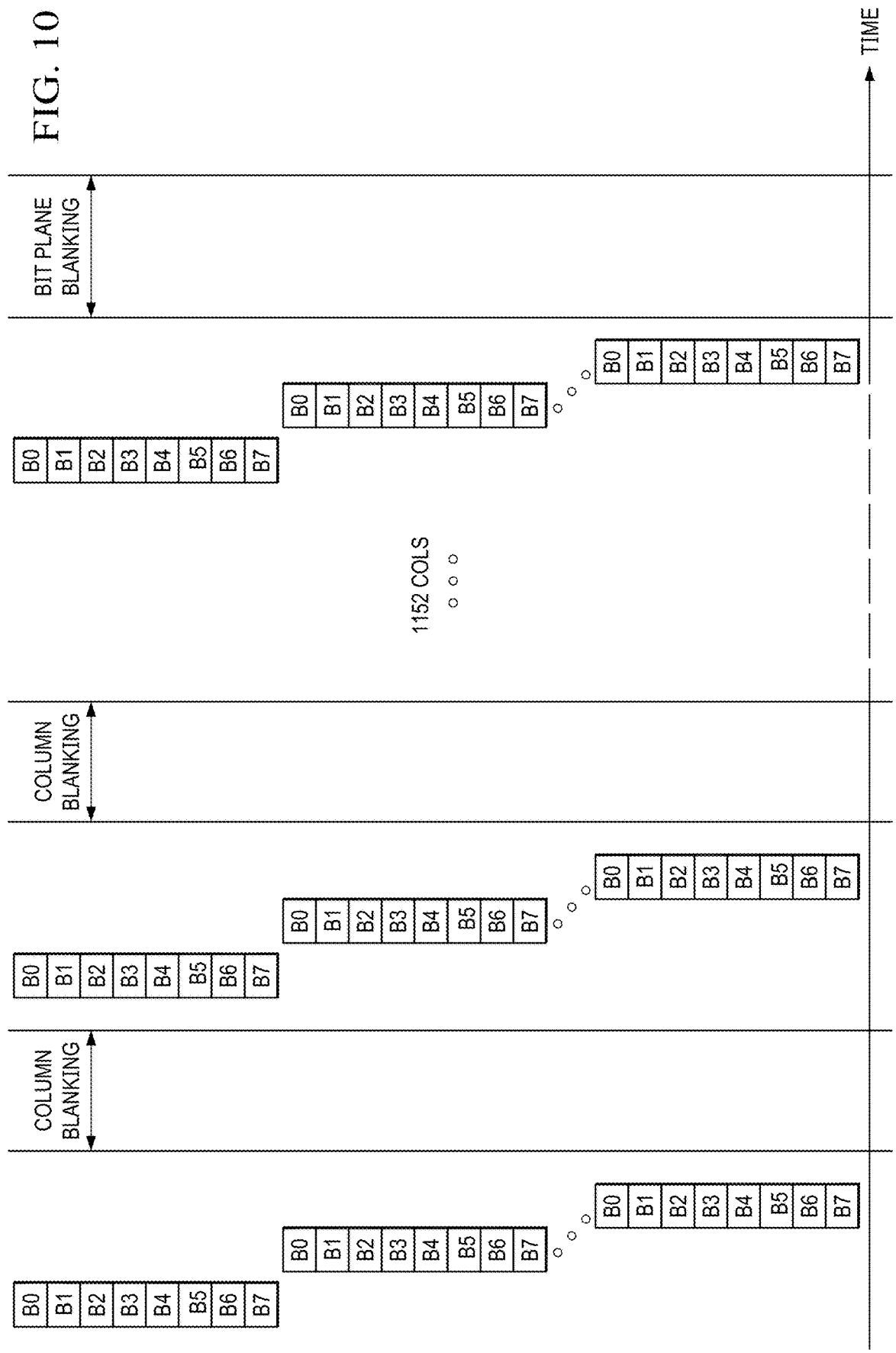
FIG. 10 is an example illustrating the operation of the bit plane generation component of FIG. 2.

FIG. 10 is an example illustrating the operation of the bit plane generation component 114 (FIG. 1) to generate a bit plane. The eight pipelines 202-206 (FIG. 2) operate in parallel to output groups of eight consecutive bits of a column of a bit plane at each clock cycle (once the pipelines are full) which are stored in corresponding bit locations in the column buffer 208. The groups of eight bits are output until 512 bits are stored in the column buffer 208. When the column buffer 208 is full, the contents of the buffer 208 are output to the SLM interface 116 which loads the column of bits for projection by the SLM 120. As shown in FIG. 10, after each column of bits is generated, there is a column blanking period to allow the bit plane generation component 114 to empty the column buffer 208 and update configuration parameters of the eight pipelines 202-206 as needed for generating the next column of bits.

In some embodiments, during each column blanking period, the control components 210-214 (FIG. 2) of some of the pixel processing components compute one or more function values common to the next column of pixels and store the results in configuration parameters for these pixel processing components. More specifically, as previously described herein, some of the pixel processing components use at least one value of y (the row coordinate) that is computed as a function of the value of x (the column coordinate). Given that x is a constant for each column, the function that determines the value of y can be computed once for a column of pixels and the result provided to the same pixel processing component in each of the eight pipelines 202-206.

For example, each kink component 304 uses the value of y=mx+c to determine if an input pixel is in zone 2 (FIG. 5). The values of m, x, and c are the same for each kink component. Rather than including circuitry in each kink component to compute mx+c, the kink control component 212 coupled to all the kink components computes the value of y=mx+c for the next column during the column blanking period and stores the value in a configuration parameter for use by all the kink components. In another example, each lane tracking component 308 uses the values of $y=dl(x^2)+el(x)+fl$ and $y=dr(x^2)+er(x)+fr$. Rather than including circuitry in each lane tracking component to compute these values, the lane tracking control component (not shown) coupled to all the lane tracking components computes the values for the next column during the column blanking period and stores the values in configuration parameters for use by all the lane tracking components.

As shown in FIG. 10, after all columns of a bit plane are generated, there is a bit plane blanking period to allow for any needed updating of the configuration parameters for the next bit plane of the headlight frame. For example, the CPU 112 may update a configuration parameter that controls which bit plane is to be generated next. There is also a frame blanking period (not) shown after all the bit planes of a headlight frame are generated and projected during which the CPU 112 may update configuration parameters for generation of the bit planes of the next headlight frame.

Figure 11:
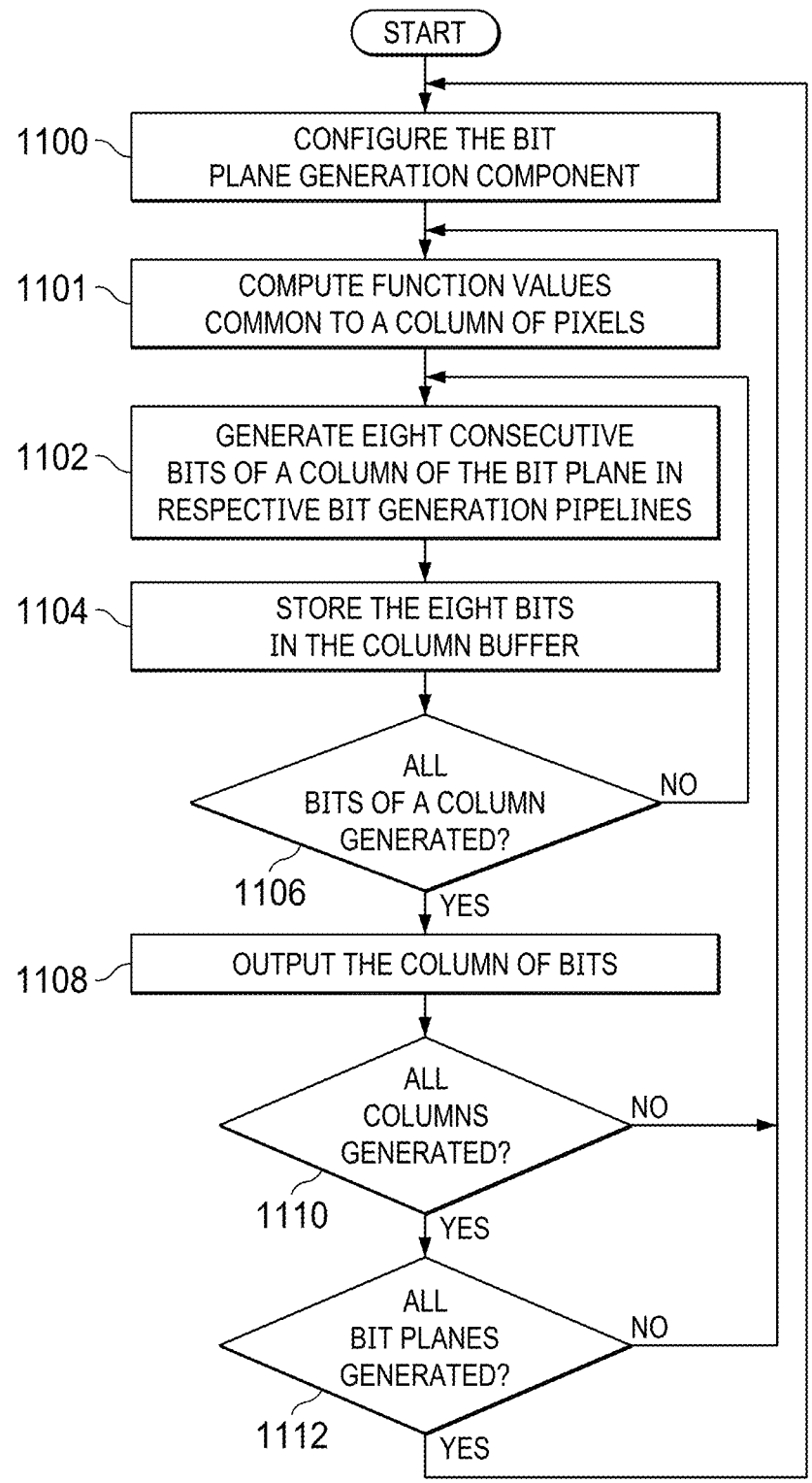
FIG. 11 is a flow diagram of a method for generating bit planes of a headlight frame in an SLM controller.

FIG. 11 is a flow diagram of a method for generating bit planes of a headlight frame in an SLM controller, e.g., the SLM controller 103 (FIG. 1). The method is explained in reference to FIG. 1, FIG. 2, FIG. 3, and FIG. 10. To initiate generation of a bit plane of a headlight frame, the bit plane generation component 114 is configured 1100 by the control application executing on the CPU 112 to generate bit planes based on the content of received headlight frame commands. For example, if the headlight frame is not to include a kink, the control application sets a parameter in the kink control component 212 to cause the kink component 304 in each pipeline 202-206 to be bypassed. In another example, if the headlight frame is to include one or more masking regions, the control application sets various configuration parameters in the object masking control component (not shown) for the object masking components 306 to indicate the coordinates of each masking region. In another example, if no symbols are to be included in the headlight frame, the control application sets a parameter in the symbol blend control component 214 to cause the symbol blend component 312 in each pipeline 202-206 to be bypassed. The control application also sets a configuration parameter for the bit plane extraction component 316 of each pipeline 202-206 to indicate which bit plane of the headlight frame is to be generated. Once the configuration parameters are initialized, the control application signals the bit plane generation component 114 to generate the designated bit plane.

Function values common to a column of pixels of the headlight frame are then computed 1101 for one or more of the pixel generation components. More specifically, as previously described herein, a control component coupled to the same type of pixel generation component in each of the pipelines 202-206 may compute at least one value of y as a function of x that is used by all these pixel generation components. For example, the value of y=mx+c is computed by the kink control component 212 and stored in a configuration parameter for use by all the kink components coupled to the kink control component 212. This step is performed before the first column of bits of a bit plane is generated and subsequently in a column blanking period after each column of bits of the bit plane (except the final one) is generated.

Eight consecutive bits of a column of the bit plane are then generated 1102 in respective bit generation pipelines 202-206 and stored 1104 in the column buffer 208. If all bits of the column have not been generated 1106, steps 1102 and 1104 are repeated. If all bits of the column have been generated 1106, the column of bits is output 1108 to the SLM interface 116. If all columns of the bit plane have not been generated 1110, steps 1101-1108 are repeated for the next column of the headlight frame. If all columns have been generated 1110 but not all bit planes of the headlight frame have been generated 1112, then steps 1101-1110 are repeated until all bit planes are generated. If all bit planes of the headlight frame have been generated 1112, then the method repeats from step 1100 to generate the bit planes of the next headlight frame.

Figure 12:
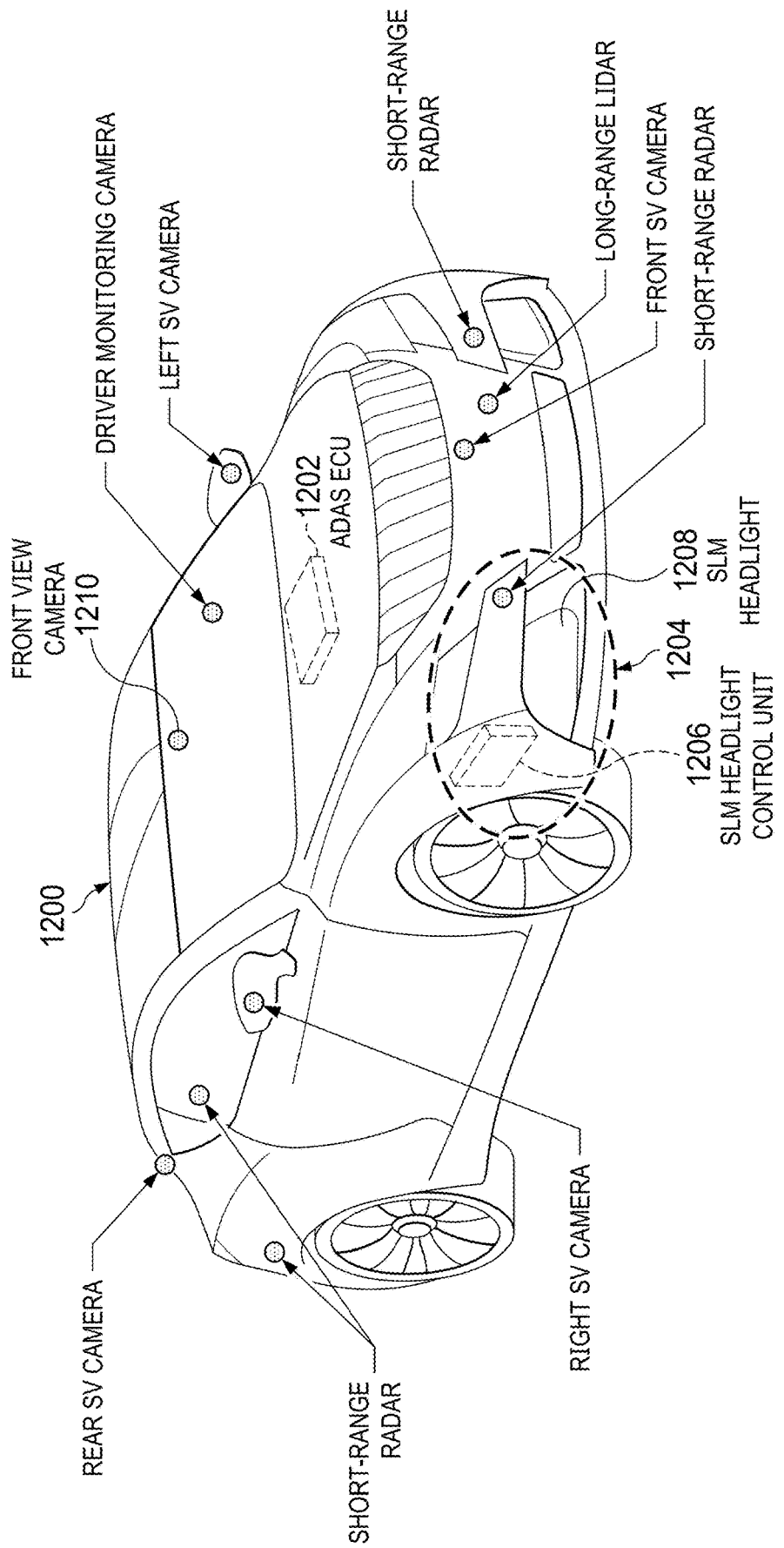
FIG. 12 is an example vehicle with SLM headlights.

FIG. 12 illustrates an example vehicle 1200 incorporating an ADAS electronic control unit (ECU) 1202 coupled to various sensors, e.g., short range radar, long range lidar, and various surround view (SV) cameras, installed around the vehicle 1200, an SLM headlight control unit 1206, and an SLM headlight 1208. The ADAS ECU 1202 includes functionality to perform ADAS applications, e.g., surround view, adaptive cruise control, collision warning, automatic braking, lane tracking, object detection, etc., using information received from the various sensors. Further, the ADAS ECU 1202 includes functionality to operate as described herein to provide headlight frame commands to the SLM headlight control unit 1206. The SLM headlight control unit 1206 is implemented as an embodiment of the SLM headlight control unit described herein.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments are described herein in which the bit plane generation component includes eight pipelines. Other embodiments may have more pipelines to increase throughput or fewer pipelines to decrease cost.

In another example, embodiments are described herein in which each bit generation pipeline includes six pixel processing components. Other embodiments may have more or few pixel processing components and/or the functionality of the components may be different. Further, the processing order of some of the components may differ. For example, the object masking component may be after the lane tracking component and/or the edge blend component may be after the symbol blend component. However, some components have some requirements for placement in the processing order. For example, the fall off component is placed before all other components in a pipeline because the fall off component generates the base headlight profile and the edge blend component is placed after any components in the pipeline that generates edges that are to be blended. The number of control components may vary according to the number of pixel processing components.

In another example, embodiments are described herein in which a control component performs some computing operations for the pixel processing components coupled to the control component and stores the results in configuration parameters for the pixel processing components. In other embodiments, the control application or another application executing on the CPU of the SLM controller may perform some or all of these computing operations.

In another example, embodiments are described herein in which the bit plane generation component generates pixels of a headlight frame in column major order. In other embodiments, the pixels are generated in row major order. In such embodiments, y (the column coordinate) is a constant for each row and functions of y common to pixel processing components can be computed once for each row during a row blanking period, e.g., in a control component or by the control application, and stored for use by the pixel processing components. Further, the extracted bits are stored in a row buffer in locations corresponding to the column of the pixel in the headlight frame.

In another example, an object masking component is described herein in which the masking regions are rectangular. In some embodiments, other shapes for masking regions, e.g., polygons, ellipses, and circles, are supported for masking complex shapes such as reflective traffic signs. In such embodiments, the control component for object masking components may compute one or more functions of x (if column major order is used to generate pixels of a headlight frame) or functions of y (if row major order is used to generate pixels of a headlight frame) for use by the object masking components.

In another example, embodiments are described herein in which the illumination for the SLM is provided by one or more LEDs coupled to an LED driver. In other embodiments, the illumination is provided by one or more lasers coupled to a laser driver. Some embodiments may include a phosphor that coverts the wavelength of light from one or more lasers or LEDs.

It is therefore contemplated that the appended claims will cover any such modifications of the embodiments as fall within the true scope of the disclosure.

What is claimed is:

1. A controller comprising:
a bit plane generation component; and
a processor configured to receive one or more headlight commands and to configure the bit plane generation component to generate bit planes of a headlight frame responsive to the one or more headlight commands,
wherein the bit plane generation component comprises bit generation pipelines configured to operate in parallel to generate respective bits of consecutive bits of a bit plane of the headlight frame.

2. The controller of claim 1, wherein the controller further comprises a buffer and the bit generation pipelines are configured to generate respective pixels of consecutive pixels of the headlight frame, to extract bits from the respective pixels at a bit position corresponding to the bit plane, and to store the bits in the buffer.

3. The controller of claim 2, wherein the consecutive pixels are in a column of pixels of the headlight frame or a row of pixels of the headlight frame.

4. The controller of claim 2, wherein a bit generation pipeline of the bit generation pipelines comprises:
pixel processing components coupled in a sequence, wherein the pixel processing components are configured to output respective pixels of the headlight frame generated in accordance with a respective aspect of a headlight profile;
a post processing component coupled to the sequence to receive a pixel output by the sequence, wherein the post processing component is configured to perform at least one of gamma correction or dithering on the pixel output by the sequence to generate a post processed pixel; and
a bit plane extraction component coupled to the post processing component to receive the post processed pixel, wherein the bit plane extraction component is configured to extract a bit from the post processed pixel at a bit position corresponding to the bit plane.

5. The controller of claim 4, wherein the bit plane generation component further comprises a control component configured to control a same pixel processing component in the bit generation pipelines, wherein the control component is configured to compute at least one function value common to the consecutive pixels and provide the at least one function value to the same pixel processing components.

6. The controller of claim 4, wherein the pixel processing components comprise a fall off component configured to generate a pixel of a base headlight profile.

7. The controller of claim 6, wherein the pixel processing components further comprise a kink component configured to receive a pixel from the fall off component and to modify a value of the pixel if the pixel is located in a high beam region of the headlight frame.

8. The controller of claim 4, wherein the pixel processing components further comprise an object masking component configured to receive a pixel from a previous pixel processing component and to modify a value of the pixel if the pixel is in a mask region of the headlight frame.

9. The controller of claim 4, wherein the pixel processing components further comprise a lane tracking component configured to receive a pixel from a previous pixel processing component and to modify a value of the pixel if the pixel is in a lane tracking region of the headlight frame.

10. The controller of claim 4, wherein the pixel processing components further comprise an edge blend component configured to receive a pixel from a previous processing component and to modify a value of the pixel if the pixel is in a blending area of the headlight frame.

11. The controller of claim 4, wherein the pixel processing components further comprise a symbol blend component configured to receive a pixel from a previous pixel processing component and to modify a value of the pixel if the pixel is in a symbol location of the headlight frame.

12. The controller of claim 1, wherein the processor and the bit plane generation component are in a system-on-a-chip (SOC) or a field programmable gate array (FPGA).

13. A method comprising:
generating, by bit generation pipelines comprised in a bit plane generation component in a controller, consecutive bits of a bit plane of a headlight frame, wherein the bit generation pipelines are configured to operate in parallel to generate respective bits of the consecutive bits of the bit plane, wherein the consecutive bits are from a column of the bit plane or a row of the bit plane; and storing the consecutive bits in a buffer in the controller.

14. The method of claim 13, wherein generating consecutive bits further comprises:
generating, in the bit generation pipelines, respective pixels of consecutive pixels of the headlight frame; and
extracting bits from the respective pixels at a bit position corresponding to the bit plane.

15. The method of claim 14, wherein a bit generation pipeline of the bit generation pipelines comprises pixel processing components coupled in a sequence, wherein the pixel processing components are configured to output respective pixels of the headlight frame generated in accordance with a respective aspect of a headlight profile.

16. The method of claim 15, further comprising determining at least one function value common to the consecutive pixels, wherein the at least one function value is provided to a same pixel processing component in the bit generation pipelines.

17. The method of claim 15, further comprising generating a pixel according to a base headlight profile by a fall off component comprised in the sequence of pixel processing components.

18. The method of claim 17, further comprising receiving a pixel from the fall off component in a kink component comprised in the sequence of pixel processing components and modifying a value of the received pixel by the kink component if the received pixel is located in a high beam region of the headlight frame.

19. The method of claim 15, further comprising receiving a pixel from a previous pixel processing component in an object masking component comprised in the sequence of pixel processing components and modifying a value of the pixel by the object masking component if the pixel is in a mask region of the headlight frame.

20. The method of claim 15, further comprising receiving a pixel from a previous pixel processing component in a lane tracking component comprised in the sequence of pixel processing components and modifying a value of the pixel by the lane tracking component if the pixel is in a lane tracking region of the headlight frame.

21. The method of claim 15, further comprising receiving a pixel from a previous pixel processing component in an edge blend component comprised in the sequence of pixel processing components and modifying a value of the pixel by the edge blend component if the pixel is in a blending area of the headlight frame.

22. The method of claim 15, further comprising receiving a pixel from a previous pixel processing component in a symbol blend component comprised in the sequence of pixel processing components and modifying a value of the pixel by the symbol blend component if the pixel is in a symbol location of the headlight frame.

23. The method of claim 15, further comprising receiving a pixel output by the sequence in a post processing component comprised in the bit generation pipelines and applying at least one of gamma correction or dithering on the pixel by the post processing component.

24. A vehicle comprising:
a headlight comprising a spatial light modulator (SLM);
an SLM headlight controller comprising:
an SLM interface coupled to the SLM;
a bit plane generation component coupled to the SLM interface, wherein the bit plane generation component comprises bit generation pipelines configured to operate in parallel to generate respective bits of consecutive bits of a bit plane of a headlight frame; and
a processor coupled to the bit plane generation component and the processor configured to receive one or more headlight commands and to configure the bit plane generation component responsive to the one or more headlight commands; and
an advanced driver assistance systems (ADAS) electronic control unit (ECU) coupled to the processor, the ADAS ECU configured to generate the one or more headlight commands.

25. The vehicle of claim 24, wherein the SLM headlight controller further comprises a buffer and the bit generation pipelines are configured to generate respective pixels of consecutive pixels of the headlight frame, to extract bits from the respective pixels at a bit position corresponding to the bit plane, and to store the bits in the buffer, wherein the consecutive pixels are in a column of pixels of the headlight frame or a row of pixels of the headlight frame.

26. The vehicle of claim 25, wherein a bit generation pipeline of the bit generation pipelines comprises:
pixel processing components coupled in a sequence, wherein the pixel processing components are configured to output respective pixels of the headlight frame generated in accordance with a respective aspect of a headlight profile and wherein the pixel processing components comprise one or more of a fall off component, a kink component, an object masking component, a lane tracking component, an edge blend component, and a symbol blend component;
a post processing component coupled to the sequence to receive a pixel output by the sequence, wherein the post processing component is configured to perform at least one of gamma correction and dithering on the pixel output by the sequence to generate a post processed pixel; and
a bit plane extraction component coupled to the post processing component to receive the post processed pixel, wherein the bit plane extraction component is configured to extract a bit from the post processed pixel at a bit position corresponding to the bit plane.

27. The vehicle of claim 26, wherein the bit plane generation component further comprises a control component coupled to control a same pixel processing component in the bit generation pipelines, wherein the control component is configured to determine at least one function value common to the consecutive pixels and to provide the at least one function value to the same pixel processing components.

* * * * *